US006670438B1

(12) United States Patent
Morse et al.

(10) Patent No.: US 6,670,438 B1
(45) Date of Patent: Dec. 30, 2003

(54) METHODS, COMPOSITIONS, AND BIOMIMETIC CATALYSTS FOR IN VITRO SYNTHESIS OF SILICA, POLYSILSEQUIOXANE, POLYSILOXANE, AND POLYMETALLO-OXANES

(75) Inventors: Daniel E. Morse, Santa Barbara, CA (US); Galen D. Stucky, Goleta, CA (US); Timothy D. Deming, Summerland, CA (US); Jennifer Cha, Goleta, CA (US); Katsuhiko Shimizu, Tochigi (JP); Yan Zhou, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/856,599

(22) PCT Filed: Dec. 18, 1999

(86) PCT No.: PCT/US99/30601

§ 371 (c)(1), (2), (4) Date: Jul. 16, 2001

(87) PCT Pub. No.: WO00/35993

PCT Pub. Date: Jun. 22, 2000

Related U.S. Application Data

(60) Provisional application No. 60/112,944, filed on Dec. 18, 1998.

(51) Int. Cl.[7] .............................................. C08G 77/08
(52) U.S. Cl. ............................. 528/21; 528/12; 528/39; 528/43; 528/23; 435/188.5; 423/339; 423/326; 428/364; 428/369; 428/370; 428/402
(58) Field of Search .............................. 528/12, 21, 23, 528/39, 43; 428/364, 369, 370, 402; 423/339, 326; 435/188.5

(56) References Cited

U.S. PATENT DOCUMENTS

| | | | | |
|---|---|---|---|---|
| 3,474,070 A | * | 10/1969 | Levene | |
| 4,746,693 A | * | 5/1988 | Meder | 524/306 |
| 6,004,444 A | * | 12/1999 | Aksay et al. | 204/515 |
| 6,310,110 B1 | * | 10/2001 | Markowitz et al. | 521/99 |
| 6,592,764 B1 | * | 7/2003 | Stucky et al. | 210/660 |

OTHER PUBLICATIONS

Shimizu, K, "Silicatein alpha: Cathepsin L–Like Protein in Sponge Biosilica" Proc. Nat'l Acad, Sci. May, 1998 pp 6234–6238.*

Cha, J.N., K. Shimizu, Y. Zhou, S.C. Christiansen, B.F. Chmelka, G.D. Stucky and D.E. Morse. Jan., 1999. Silicatein filaments and subunits from a marine sponge direct the polymerization of silica and silicones in vitro. Proc. Natl. Acad. Sci. USA 96: 361–365.

Morse, D.E. Jun., 1999. Silicon biotechnology: Harnessing biological silica production to make new materials. Trends in Biotechnology 17: 230–232.

* cited by examiner

*Primary Examiner*—Margaret G. Moore
(74) *Attorney, Agent, or Firm*—Fulbright & Jaworski

(57) ABSTRACT

Methods, compositions, and biomimetic catalysts, such as silicateins and block copolypeptides, used to catalyze and spatially direct the polycondensation of silicon alkoxides, metal alkoxides, and their organic conjugates to make silica, polysiloxanes, polymetallo-oxanes, and mixed poly(silicon/metalklo)oxane materials under environmentally benign conditions.

46 Claims, 5 Drawing Sheets

1 μm
3.5KV X33,000 8mm

1 μm
414619 3.5KV X33,000 24mm

1 μm
3.5KV X18,000 7mm

1 μm
3.0KV X45,000 15mm

1 μm
0020 3.5KV X4,500 15mm

1 μm
0014 3.5KV X4,300 15mm

───── 200μm

── 1μm
3.0KV X6,500 14mm

SEQUENCE LISTING

<160> NUMBER OF SEQ ID NOS: 2

<210> SEQ ID NO 1
<211> LENGTH: 330
<212> TYPE: PRT
<213> ORGANISM: Tethya aurantia

<400> SEQUENCE: 1

Met Tyr Leu Gly Thr Leu Val Val Leu Cys Val Leu Gly Ala Ala Ile
 1               5                  10                  15

Gly Glu Pro Met Pro Gln Tyr Glu Phe Lys Glu Glu Trp Gln Leu Trp
            20                  25                  30

Lys Lys Gln His Asp Lys Ser Tyr Ser Thr Asn Leu Glu Glu Leu Glu
        35                  40                  45

Lys His Leu Val Trp Leu Ser Asn Lys Lys Tyr Ile Glu Leu His Asn
    50                  55                  60

Ala Asn Ala Asp Thr Phe Gly Phe Thr Leu Ala Met Asn His Leu Gly
65                  70                  75                  80

Asp Met Thr Asp His Glu Tyr Lys Glu Arg Tyr Leu Thr Tyr Thr Asn
                85                  90                  95

Ser Lys Ser Gly Asn Tyr Thr Lys Val Phe Lys Arg Glu Pro Trp Met
            100                 105                 110

Ala Tyr Pro Glu Thr Val Asp Trp Arg Thr Lys Gly Ala Val Thr Gly
        115                 120                 125

Ile Lys Ser Gln Gly Asp Cys Gly Ala Ser Thr Ala Phe Ser Ala Met
    130                 135                 140

Gly Ala Leu Glu Gly Ile Asn Ala Leu Ala Thr Gly Lys Leu Thr Tyr
145                 150                 155                 160

Leu Ser Glu Gln Asn Ile Ile Asp Cys Ser Val Pro Tyr Gly Asn His
                165                 170                 175

Gly Cys Lys Gly Gly Asn Met Tyr Val Ala Phe Leu Tyr Val Val Ala
            180                 185                 190

Asn Glu Gly Val Asp Asp Gly Gly Ser Tyr Pro Phe Arg Gly Lys Gln
        195                 200                 205

Ser Ser Cys Thr Tyr Gln Glu Gln Tyr Arg Gly Ala Ser Met Ser Gly
    210                 215                 220

Ser Val Gln Ile Asn Ser Gly Ser Glu Ser Asp Leu Glu Ala Ala Val
225                 230                 235                 240

Ala Asn Val Gly Pro Val Ala Val Ala Ile Asp Gly Glu Ser Asn Ala
                245                 250                 255

Phe Arg Phe Tyr Tyr Ser Gly Val Tyr Asp Ser Ser Arg Cys Ser Ser
            260                 265                 270

Ser Ser Leu Asn His Ala Met Val Ile Thr Gly Tyr Gly Ile Ser Asn
        275                 280                 285

Asn Gln Glu Tyr Trp Leu Ala Lys Asn Ser Trp Gly Glu Asn Trp Gly
    290                 295                 300

Glu Leu Gly Tyr Val Lys Met Ala Arg Asn Lys Tyr Asn Gln Cys Gly
305                 310                 315                 320

Ile Ala Ser Asp Ala Ser Tyr Pro Thr Leu
                325                 330

<210> SEQ ID NO 2
<211> LENGTH: 1360
<212> TYPE: DNA

```
<213> ORGANISM: Tethya aurantia

<400> SEQUENCE: 2
atcgaatcaa atcgtgagta ttgctccgag ttccaaggaa agtgaaagca aaggattcca        60
gctacagtaa agatgtatct cggcacgttg gttgttttgt gtgttttggg ggctgctatt       120
ggagagccaa tgcctcagta tgagttcaag gaggaatggc agctgtggaa gaaacaacat       180
gacaagtctt acagcaccaa cttggaggaa ctggagaaac atcttgtctg gctctccaac       240
aagaagtaca ttgaactgca caatgccaat gcagacacct ttggattcac tctagctatg       300
aaccatctag gagatatgac tgaccatgaa tacaaggaga gatacctcac atacactaac       360
agcaaatctg gtaactacac caaggtgttc aaacgtgagc catggatggc ctacccggag       420
actgtagatt ggagaacaaa gggcgctgtg actggtatca agagccaggg agattgtggt       480
gccagctatg cattcagtgc catgggtgca cttgaaggaa tcaatgcact tgctactgga       540
aagctgacct atctcagtga acagaacatc attgattgct ctgtaccttta tggtaaccat       600 ggttgcaagg gtggaaacat gtatgtggct ttcctctatg ttgttgctaa cgaaggagtt       660
gatgatgggg gttcctatcc atttagagga aagcaatcca gttgtacgta tcaagagcag       720
taccgtggtg caagtatgtc tggctcagtt caaatcaaca gtggtagtga atctgatctg       780
gaagcagctg tagccaatgt tggtccagtt gcagtagcta ttgatggaga gtcaaatgct       840
ttcagattct attacagtgg agtgtacgac tcctccagat gttctagtag cagtctcaac       900
cacgccatgg tgatcactgg ctatggaatt tcaaataacc aggaatactg gcttgcaaag       960
aacagctggg gtgagaactg gggagaactg ggctatgtga agatggccag gaacaagtac      1020
aatcaatgtg ggattgctag tgatgcctcc taccccactc tctagcatgt cagccagccc      1080
agtctgaaac tgaactagaa ttatcaatag ttaaataact gtgtgttttta tacatgtgaa      1140 caatagactt gatcatcctt tagtaagtat tatatgtgat gagtgtttgt ccaatccaac      1200
attagctctg acatgtaaat tattgtaata atgattctgt gattatgtct caatgattat      1260
tgtattcaca atggcatcta atttgtatac aagcccctca atcactgact gatctcatta      1320
taatttattt gatggactac aaaaaaaaaa aaaaaaaaa                             1360
```

METHODS, COMPOSITIONS, AND BIOMIMETIC CATALYSTS FOR IN VITRO SYNTHESIS OF SILICA, POLYSILSEQUIOXANE, POLYSILOXANE, AND POLYMETALLO-OXANES

CROSS REFERENCE TO RELATED APPLICATIONS

This application claims the benefit of Provisional Patent Application No. 60/112,944, filed Dec. 18, 1998.

STATEMENT REGARDING FEDERALLY FUNDED RESEARCH OR DEVELOPMENT

This invention was made with Government support under Grant No. N0014-93-10584, awarded by the Office of Naval Research; Grant No. DAAH-04-96-1-0443 awarded by the Army Research Office; Grant No. NA36RG0537, awarded by the National Oceanic and Atmospheric Administration; and Grant Nos. DMR32716 and DMR34396, awarded by the National Science Foundation. The Government has certain rights in this invention.

BACKGROUND OF THE INVENTION

Silicon, the second most abundant element on Earth, is widely used in the manufacture of siloxane-based semiconductors, glasses, ceramics, plastics, elastomers, resins, mesoporous molecular sieves and catalysts, optical fibers and coatings, insulators, moisture shields, photoluminescent polymers, and cosmetics [Auner, N. and Weis., J. (1998) *Organosilicon Chemistry III: From Molecules to Materials*, Wiley W C H; Auner, N. and Weis, J. *Organosilicon Chemistry IV: From Molecules to Materials*, Wiley W C H (in press); and Ball P. (1997) *Made to Measure: New Materials for the 21$^{st}$ Century*, Princeton University Press, Princeton, N.J., USA]. The Manufacture of these materials typically requires high temperatures or the use of caustic chemicals.

By contrast, the biological production of amorphous silica, the simplest siloxane $[(SiO_2)_n]$, is accomplished under mild physiological conditions, producing a remarkable diversity of exquisitely structured shells, spines, fibers, and granules in many protists, diatoms, sponges, molluscs and higher plants [Simpson, T. L. and Volcani, B. E. (1981) *Silicon and Siliceous Structures in Biological Systems*, Springer-Verlag; and Voronkov, M. G., Zelchan, G. I. and Lukevits, E. J. (1997) *Silicon and Life* (2$^{nd}$ edn), Zinatne Publishing, Vilnius, Lithuania]. These biologically produced silicas exhibit a genetically controlled precision of nanoscale architecture that, in many cases, exceeds the capabilities of present-day human engineering. Furthermore, the biological production of siloxanes occurs on an enormous scale globally, yielding gigatons per year of silica deposits on the floor of the ocean. Diatomaceous earth (composed of the nanoporous skeletons of diatoms) is mined in great quantities from the vast primordial deposits of this biogenic silica.

Biotechnical approaches are now starting to unlock the molecular mechanisms of polysiloxane synthesis under physiological conditions, offering the prospect of new, environmentally benign routes to the synthesis and structural control of these important materials. Taking advantage of marine organisms that produce large relative masses of biogenic silica, molecular biologists have begun to isolate the genes and proteins controlling silica biosynthesis and nanofabrication.

Hildebrand and colleagues made a significant breakthrough by cloning and characterizing the cDNA encoding the first silicic-acid $[Si(OH)_4]$ transporter to be unequivocally identified [Hildebrand, M., Volcani, B. E., Gassman, W., & Schroeder, J. I. (1997) *Nature* 385, 688–689]. They showed, by analysis of the encoded protein and by injection of the mRNA (synthesized in vitro from the cloned cDNA) into Xenophus eggs, that the transporter protein forms a sodium-dependent transmembrane ion channel that mediates the transport of silicic acid. The action of this protein can account for the uptake of the silica precursor from the dilute pool of silicic acid in oceanic and fresh water, and similar transporters may pump silicic acid (or its conjugates) into the lumen of the silica-deposition vesicle (silicalamella), in which polycondensation (polymerization) is known to occur.

Kröger and colleagues have cloned and characterized cDNAs encoding two families of protein (at least one of which is glycosylated) that contribute to the organic sheath surrounding the silica walls of a diatom [Kröger, N., Bergsdorf, C. and Sumper, M. (1994) *EMBO J.* 13, 4676–4683; and Kröger, N., Lehmann, G., Rachel, R. and Sumper, M. (1997) *Eur. J. Biochem.* 250, 99–105.]. The proteins most intimately associated with these silica walls contain regularly repeating hydroxyl-rich domains potentially capable of interacting with the growing silica structure [Hecky, R. E., Mopper, K., Kilham, P., & Degens, E. T. (1973) *Mar. Biol.* 19,323–331; Swift, D. M. & Wheeler, A. P. (1992) *Phycology* 28, 209–213; and Harrison, C. C. (1996) *Phytochemistry* 41, 37–42]. Hecky et al. had proposed that such hydroxyl-rich domains might align silicic-acid monomers, either by condensing with them (with elimination of water) to form covalent adducts or by hydrogen bonding, thus bringing them into favorable juxtaposition for their condensation to form silica. Thermodynamic calculations support the energetic feasibility of such a pathway [Lobel, K. D., West, J. K., & Hench, L. L. (1996) *Mar. Biol.* 126, 353–360].

Other researchers have suggested that various organic conjugates of silicic acid might serve as the proximate substrates for polymerization in vivo. Silicon catecholates have been used by Perry et al. in extensive studies of silica polymerization promoted by sugars and polysaccharides from silicified plants (Harrison, C. C. (1996) *Phytochemistry* 41, 37–42; Harrison, C. C., & Loton, N. J. (1995) *J. Chem. Soc.-Faraday Trans.* 91, 4287–4297; and Perry, C. C. & Yun, L. J. (1992) *J. Chem. Soc.-Faraday Trans.* 88, 2915–2921), and Mann and his colleagues recently showed that bacterial filaments can direct the deposition of a colloidal silica gel which after calcination yielded a macroporous filamentous material [Davis, S. A., Burkett, S. L., Mendelson, N. H., & Mann, S. (1997) *Nature* 385, 420–423].

In contrast to anthropogenic and geological syntheses of these materials that require extremes of temperature, pressure or pH, living systems produce a remarkable diversity of nanostructured silicates at ambient temperatures and pressures and at near-neutral pH. Laboratory methods have been unable to replicate these results and rely instead on extreme pHs and/or surfactants to condense silica precursors into specific morphologies or patterned structures. These conditions are undesirable for environmental reasons and therefore methods to direct silica assembly under conditions similar to those used in nature (i.e. biomimetically) are desired.

SUMMARY OF THE INVENTION

The present invention overcomes the drawbacks of prior efforts to condense silica precursors into specific morphologies or patterned structures, and provides heretofore unattainable materials having very desirable and widely useful properties. These materials are prepared at ambient temperatures and pressures and at near-neutral pH.

The method of the present invention for in vitro polymerization of silica and silicone polymer networks, includes the steps of (1) combining a catalyst and a substrate, wherein the substrate is selected from the group consisting of silicon alkoxide, metal alkoxide, and organic conjugates of the foregoing; and (2) polymerizing the substrate to form silica, polysiloxanes, polymetallo-oxanes, or mixed poly(silicon/metallo)oxane materials at about neutral pH. Preferably the substrate is a silicon alkoxide having the general formula R—Si—(O—Et)$_3$, wherein Et is ethyl and R is methyl, phenyl, or ethoxy. Moreover, the polymerized materials preferably include apolysilsesquioxame having the general formula $(RSiO_{3/2})_n$, wherein n is an integer greater than 1.

The present invention also provides compositions for use in polymerizing silica and silicone polymer networks, which includes a silicon alkoxide substrate; and a catalyst that assembles, hydrolyzes, and condenses the substrate at about neutral pH. A catalyst according to the present invention is generally a protein or polypeptide. Preferred protein or polypeptide catalysts include silicatein filaments, silicatein subunits, cysteine homopolymers, and cysteine-containing block copolypeptides. A preferred silicatein is a protein comprising an amino acid sequence at least 70% identical to the amino acid sequence of silicatein α, i.e., SEQ ID NO:1. Alternatively the catalyst is a recombinant protein encoded by a nucleotide sequence at least 70% identical to the coding regions of SEQ ID NO:2, which is the cDNA sequence of the silicatein α gene. Yet another group of catalysts of the present invention, which unexpectedly mimic the polymerizing and scaffolding activities of silicateins, are cysteine-containing block copolypeptides. The most preferred versions the diblock copolypeptides are poly(L-Cysteine$_{10}$-b-L-Lysine$_{200}$), poly(L-Cysteine$_{30}$-b-L-Lysine$_{200}$), poly(L-Cysteine$_{60}$-b-L-Lysine$_{200}$), and poly(L-Cysteine$_{30}$-b-L-Lysine$_{400}$).

Silicified structures can be synthesized according to the method of the present invention. These structures assume a shape directed by the scaffolding activity of the catalyst. Such silicified structures can include shapes, such as filaments, spheres, elongated globules, and columns.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE PREFERRED EMBODIMENT

Figure 1A:
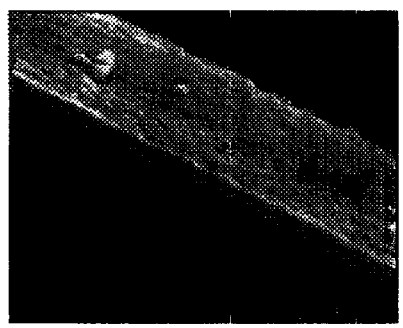
FIG. 1 shows scanning electron micrographs of the products of reactions between silicon alkoxides and silicatein or cellulose filaments. (A) silicatein filaments prior to reaction. (B) silicatein filaments after 12 h reaction with TEOS (1.0 ml; 4.5 mmoles) plus Tris-HCl buffer. (C) air-dried silicatein filaments incubated with TEOS as in (B) but with no additional water. (D) silicatein filaments after 8 h reaction with phenyltriethoxysilane (1.0 ml; 4.1 mmoles) plus Tris-HCl buffer. (E) cellulose fiber. (F) cellulose fiber after 12 h reaction with TEOS as in (B).

This invention provides a simple and general procedure for the in vitro syntheses of silica, polysiloxanes, polymetallo-oxanes, and mixed poly(silicon/metallo)oxane materials under environmentally benign conditions. Proteins, such as silicatein filaments, subunits, and recombinant subunit α; synthetic polypeptides, including block copolypeptides or cysteine homopeptides; and other polymers can be used as catalysts, which spatially direct the polymerization of silicon alkoxides, metal alkoxides, and their organic conjugates.

Potential applications for the reaction products include, but are not limited to, resin toughening, electronic and optoelectronic devices, packaging, insulators, fire-resistant materials, construction materials, plastics, metalloplastic composites, adhesives, water-resistant sealants, and filtration membranes.

Representative examples include: the synthesis of silica, poly-methyl-silsesquioxane and poly-phenyl-silsesquioxane catalyzed and spatially directed by silicatein filaments, subunits, and subunit a produced in bacteria from a recombinant DNA template. Additional examples include the catalysis and spatial control of silica and polysilsesquioxane synthesis by block copolypeptides and other polymers.

Catalysts

The catalysts used in the present invention include proteins and synthetic polypeptides that mimic the in vivo activity of proteins that control silicification in marine organisms. For example, the marine sponge, *Tethya aurantia*, produces copious silica spicules (1–2mm length× 30 μm diameter) that constitute 75% of the dry weight of the organism. These spicules each contain a central axial filament of protein (1–2 mm length×2 μm diameter) consisting of three very similar subunits we have named silicateins (for silica proteins) [Shimuzu, K., Cha, J., Stucky, G. D., & Morse, D. E. (1998) *Proc. Natl. Acad. Sci.* 95, 6234–6238; incorporated herein by reference in its entirety]. The α, β and γ subunits are quite similar in amino acid composition and pI, with apparent molecular masses of 29, 28, and 27 kDa. Densitometric analysis reveal these subunits to be present in relative proportions of approximately α:β:γ= 12:6:1.

Silicatein filaments and their constituent subunits comprising the axial cores of silica spicules in a marine sponge chemically and spatially direct the polymerization of silica and silicone polymer networks from the corresponding alkoxide substrates in vitro, under conditions in which such syntheses otherwise require either an acid or base catalyst. Characterization of silicatein α (the subunit comprising nearly 70% of the mass of the filaments) and its cloned cDNA revealed that silicatein α is homologous to members of the cathepsin L subfamily of the papain family of proteolytic enzymes. The amino acid sequence of the silicatein α subunit is disclosed herein as SEQ ID NO:1 and the cDNA encoding this sequence is SEQ ID NO:2.

Preferred versions of the present invention utilize catalysts that are members of the silicatein family. As will be appreciated by those of skill in the art, members of the silicatein family may be subject to evolutionary and man-made variations. Accordingly silicateins include: (1) amino acid sequences that are, at least 70% identical, preferably at least 80% identical, more preferably at least 90% identical, and most preferably at least 95% identical to SEQ ID NO:1; (2) the functional equivalents of these proteins which retain catalytic and/or scaffolding activities; and (3) biologically active derivatives, including silicatein-derived fragments. The percent identity of the amino acid sequences of silicateins are as determined by FASTA or BLAST using default opening and gap penalties and a default scoring matrix (available at the National Center for Biotechnology Information website; http:\\www.ncbi.nlm.nih.gov\). For simplicity, the term "silicatein" is used to describe both the native or wild type silicateins and those silicateins with sequences altered by the hand of man (engineered silicateins).

More particularly, the protein catalysts include silicateins derived from the spicules of a marine sponge. A macroscopic silicatein purified from spicules that contains assembled subunits is an "silicatein filament," whereas an isolated silicatein protein molecule is referred to as a silicatein subunit. Examples of silicatein subunits include subunits α, β and γ as described by Shimuzu et al. (1998), supra.

The term "wild type" refers to those silicateins that have an amino acid sequence as found in the natural environment. This term therefore refers to the sequence characteristics, irrespective of whether the actual molecule is purified from natural sources, synthesized in vitro, or obtained following recombinant expression of a silicatein-encoding DNA molecule in a host cell.

The terms "mutant, variant or engineered" silicatein refer to those silicateins the amino acid sequence of which have been altered with respect to the sequence of the silicatein found in nature. This term thus describes silicateins that have been altered by the hand of man, irrespective of the manner of making the modification, e.g., whether recombinant DNA techniques or protein chemical modifications are employed.

"Native" silicateins are those that have been purified from their natural sources, such as from spicules of a marine sponge. Native silicateins will also generally have wild type sequences.

"Recombinant" silicateins are those molecules produced following expression of a silicatein recombinant DNA molecule, or gene, in a prokaryotic or eukaryotic host cell, or even following translation of an RNA molecule in an in vitro translation system. "Synthetic" silicateins are those silicateins produced using synthetic chemistry, most usually in the form of automated peptide synthesis. Both recombinant and synthetic silicateins may have either wild type or mutant sequences, as designed.

Structural and Functional Domains of Silicatein Catalysts: Analysis of the amino acid sequence revealed that silicatein α is made biosynthetically as a "pre-pro-protein":, with two peptide fragment successively removed from the amino-terminal end by proteolytic enzymes that cut the protein as it is secreted into the membrane-enclosed silica deposition vesicle (SDV) and then folded into its final 3-dimensional conformation. The "signal peptide" that facilitates recognition and secretion into the SDV is cleaved by a specific "signal peptidase". After folding the protein within the SDV, the remaining N-terminal "propeptide" is then removed to release the mature silicatein. The sequences of the amino acids that specify the sites of these two cleavages are homologous to those found in the precursors of other members of the papain family as well.

Comparison of the silicatein α and cathepsin L sequences [Shimuzu et al. (1998), supra] also reveals that the six cysteine residues that form intramolecular disulfides in cathepsin L are fully conserved in the silicatein, suggesting that the 3-dimensional structures of the two proteins are quite similar. Two of the three residues (His and Asn) of the "catalytic triad" of the cathepsin active site also are conserved in silicatein α, but the third active-site residue in cathepsin, Cys, is replaced in the silicatein by $Ser_{26}$, preventing this protein from being an effective protease [Shimuzu et al. (1998), supra]. At this position, the structure of silicatein α resembles that of the other major class of proteases, the serine proteases, typified by trypsin and chymotrypsin. Recent site-directed mutagenesis results confirm the requirement for the specific serine$_{26}$ and histidine$_{165}$ residues of silicatein α for catalysis of the siloxane polymerization described here [Morse, D. E. (1 999), supra; and Zhou, Y., Shimizu, K., Cha, J. N., Stucky, G. D., and Morse, D. E. (1999) *Ang. Chemie, Intl. Ed.* 38, 779–782, incorporated herein by reference in its entirety]. Accordingly, preferred versions of the present invention will utilize silicatein subunit α, which contains serine$_{26}$ and histidine$_{165}$ residues, as the catalyst.

Hecky et al. postulated that the hydroxyl-rich proteins of the silicified diatom wall might condense with silicic acid monomers, thus serving as a template to organize the growth of the silica [Hecky et al. (1973), supra]. Thermodynamic calculations have been presented in support of that suggestion [Lobel et al. (1996), supra]. Such a mechanism may also contribute to the results reported here. While the lack of activity of the hydroxyl-rich cellulose and silk polymers indicates that the simple density of hydroxyls is not alone sufficient for polymerization of the silicon alkoxides, the conformation of such groups in the silicatein molecule may be important for the template-like scaffolding activity. Indeed, several runs of contiguous hydroxyls are found in silicatein α [Shimuzu et al. (1998), supra], which might be important in orienting the siloxane groups of either the substrate or product.

Mechanism of Action: Homology of silicaten α to the well-known enzyme, cathepsin L, points to a possible reaction mechanism that is supported by recent site-directed mutagenesis experiments. The condensation of silicon alkoxides promoted by the silicateins and the cleavage of peptides catalyzed by the proteases both must proceed through an obligatory hydrolysis reaction, and both are known to be accelerated by general acid-base catalysis, suggesting that the mechanism of action of silicatein α in this process may be fundamentally related to that of its homologous enzyme counterparts. The requirement for the specific serine$_{26}$ and histidine$_{165}$ residues of silicatein α for catalysis of the siloxane polymerization suggests that the mechanism of silicatein-mediated catalysis of siloxane polymerization from the alkoxide substrates may be closely parallel to that of the well characterized Ser-His and Cys-His active site proteases [Lehninger, A., Nelson, D., & Cox, M. eds. (1993) in *Principles of Biochemistry* (Worth Publishers, New York), pp. 223–227].

Figure 3:
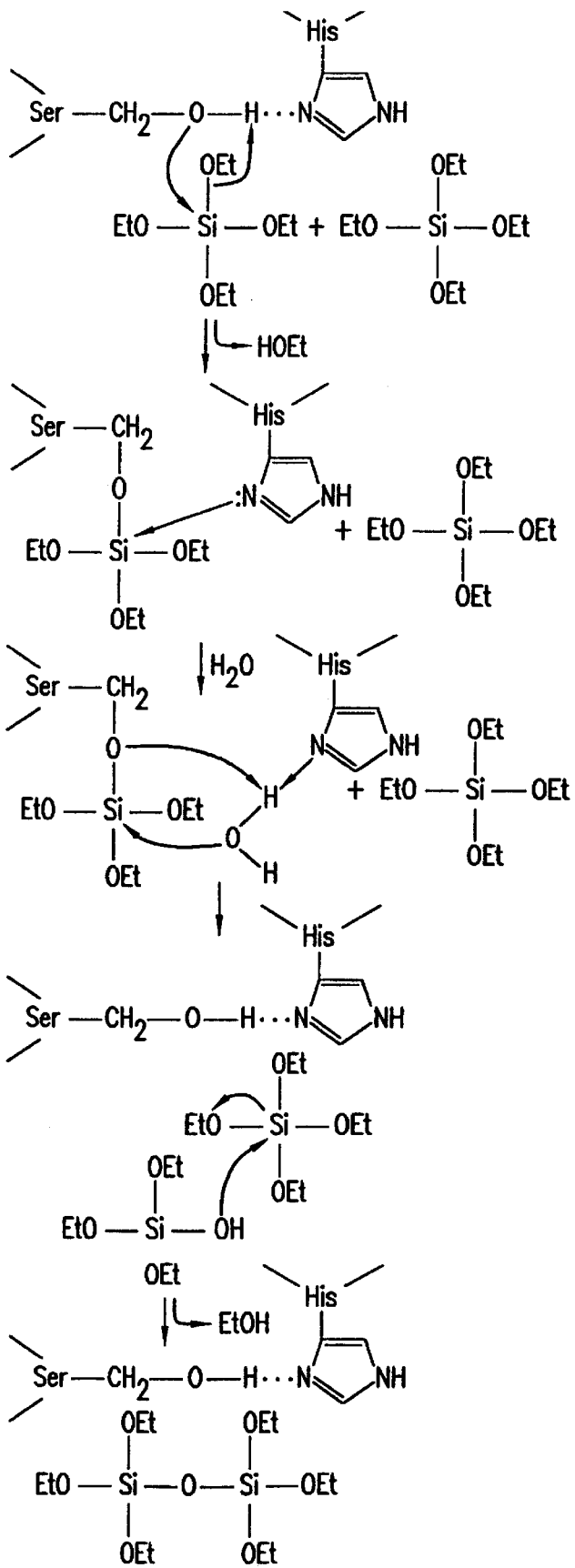
FIG. 3 shows a proposed reaction mechanism of silicon ethoxide condensation catalyzed by silicatein α, based on the well-characterized mechanism of catalysis by the serine-histidine and cysteine-histidine active-site proteases [Morse, D. E. (1999) in *Organosilicon Chemistry IV: from Molecules to Materials*, eds. Auner, N. and Weis, J. (Wiley-VCH, New York), 1999; pp. 5–16; incorporated herein by reference]. As stated therein, "Our final objective is then to use the information obtained from the studies of the mutationally altered proteins to design synthetic peptide based catalysts to test the validity of our conclusions, and to guide the design of synthetic non-peptide-based catalysts and structure-directing scaffolds that are both less expensive and more robust than the natal and genetically engineered proteins." R is phenyl- or methyl- for the silicontriethoxide substrates, and R=CH$_3$CH$_2$—O—(=EtO—) for TEOS. Hydrogen-bonding between the imidazole nitrogen of the conserved histidine and the hydroxyl of the active-site serine is proposed to increase the nucleophilicity of the serine oxygen, potentiating its attack on the silicon atom of the substrate; nucleophilic attack on the Si displaces ethanol, forming a covalent protein—O—Si intermediate (potentially stabilized as the pentavalent Si adduct via donor bond formation with the imidazole N); addition of water completes hydrolysis of the first alkoxide bond, condensation initiated by nucleophilic attack of the released Si—O on the silicon of he second substrate molecule then forms the disiloxane product.

FIG. 3 illustrates such a mechanism, whereby the silicatein actually functions as a hydrolase with these substrates, converting the silicon alkoxides to their corresponding silanols, which are known to condense rapidly and spontaneously to form polysiloxanes. This mechanism may help explain the observed acceleration of silicon alkoxide condensation promoted by silicatein α and the silicatein filaments in vitro, since is known that the rate-limiting step in this condensation is the initial hydrolysis of the alkoxide required to generate the reactive Si-O species, and that the rate of spontaneous hydrolysis is lowest at neutral pH [Iler, R. K. (1979) in *The Chemistry of Silica: Solubility, Polymerization, Colloid and Surface Properties, and Biochemistry* (John Wiley & Sons, New York), pp.98–99].

Methods of Making Silicateins; The preparation of wild type, mutant, native, recombinant and synthetic silicateins will be straightforward to those of skill in the art in light of the present disclosure. Native silicatein filaments and subunits can be prepared as described in greater detail Shimuzu et al. (1998), supra, and in the Example 1 below. Alternatively, a recombinant silicatein can be prepared by expressing the silicatien encoding segments of a silicatein gene (see, e.g., SEQ ID NO:2), including wild type and mutant genes, in a recombinant host cell and collecting the expressed protein. Preferably the silicatein encoding segments are at least about 70% identical to the coding sequences of SEQ ID NO:2, more preferably at least 80% identical, and most preferably at least 90% identical. The percent identity of the nucleotide sequences of silicateins are as determined by FASTA or BLAST using default opening and gap penalties and a default scoring matrix (available at the National Center for Biotechnology Information website; http:\\www.ncbi.nlm.nih.gov\). The host cells can be bacterial, yeast, insect, mammalian or other transformed animal cells. The coding segments can be in the form of naked DNA, or housed within any one of a variety of expression vectors, such as recombinant plasmids or viruses, which have been modified to contain and express the encoded silicatein protein. More particularly, recombinant silicatein subunit a can be expressed as a fusion protein as described in Zhou et al. (1999), supra.

Synthetic silicatein peptides can be made using automated methods for peptide synthesis. Techniques for the operation of automated peptide synthesizers is standard practice in the art and such services may be obtained commercially, as described further in a subsequent example.

Synthetic polypeptide catalysts: Synthetic polypeptides, more particularly, cysteine-lysine block copolypeptides unexpectedly mimic the properties of silicatein. These synthetic copolymers emulate silicatein by self-assembling into superstructures that can hydrolyze silicon alkoxides, while simultaneously directing the formation of the silica into ordered morphologies.

Since TEOS is stable when mixed with water at neutral pH, successful biomimetic silica synthesis from this precursor requires an agent that displays hydrolytic activity simultaneously with structure-directing properties. Site-directed mutagenesis of the cloned DNA coding for silicatein α revealed that interacting histidine and serine residues were required for the hydrolytic activity of this protein. For this reason, simple homopolypeptides of amino acids bearing polar functional groups were evaluated for their ability to mimic the properties of silicatein in the polycondensation of silicon alkoxides. However, homopolymers of L-lysine, L-histidine, D/L-serine, L-threonine, and L-glutamic acid failed to catalyze TEOS hydrolysis and condensation. In contrast, oligomers of L-cysteine efficiently produce silica from TEOS in pH 7 buffer (see Table 2 in Example II, below), when handled under an inert nitrogen atmosphere to prevent oxidation. Accordingly, preferred synthetic polypeptide catalysts include one or more nucleophilic sulfhydryl groups, which can initiate hydrolysis of the silicon alkoxide. Preferred L-cysteine homopolymers are less than about 3000 Da, since higher chain lengths are insoluble. Moreover, when these oligomers are used under air, oxidation of the sulfhydryl groups to disulfides results in insoluble aggregates that are much less active in silica formation.

Diblock copolypeptides that contain covalently linked domains (blocks) of water soluble and insoluble polypeptides are better able to mimic the catlytic activity of silicatein. Dissimilarity in the block segments provides the chains with an amphiphilic character, similar to that of surfactants, which results in self-assembly of the chains in aqueous solution. The architecture and design of the block copolypeptides also provide simple means to solubilize water-insoluble domains, e.g. hydrolytically active poly-L-cysteine. Such block copolypeptides allow the directed cooperative assembly, hydrolysis, and condensation of TEOS to form specific silica structures.

Preferably, the solubilizing block copolypeptide components are cationic polyelectrolytes, such as poly-L-lysine, which are known to be water soluble at pH 7. As water insoluble domains, poly-L-cysteine and poly-L-serine are preferred, both for their potential silica-forming hydrolytic activity as well as their ability to aggregate in water by either hydrogen or covalent bonding via β-sheet formation or disulfide linkages. Other less preferred insoluble domains include polar residues that are less nucleophilic than cysteine (poly-L-glutamine and poly-L-tyrosine) or slightly hydrophobic (poly-L-alanine).

Figure 4:
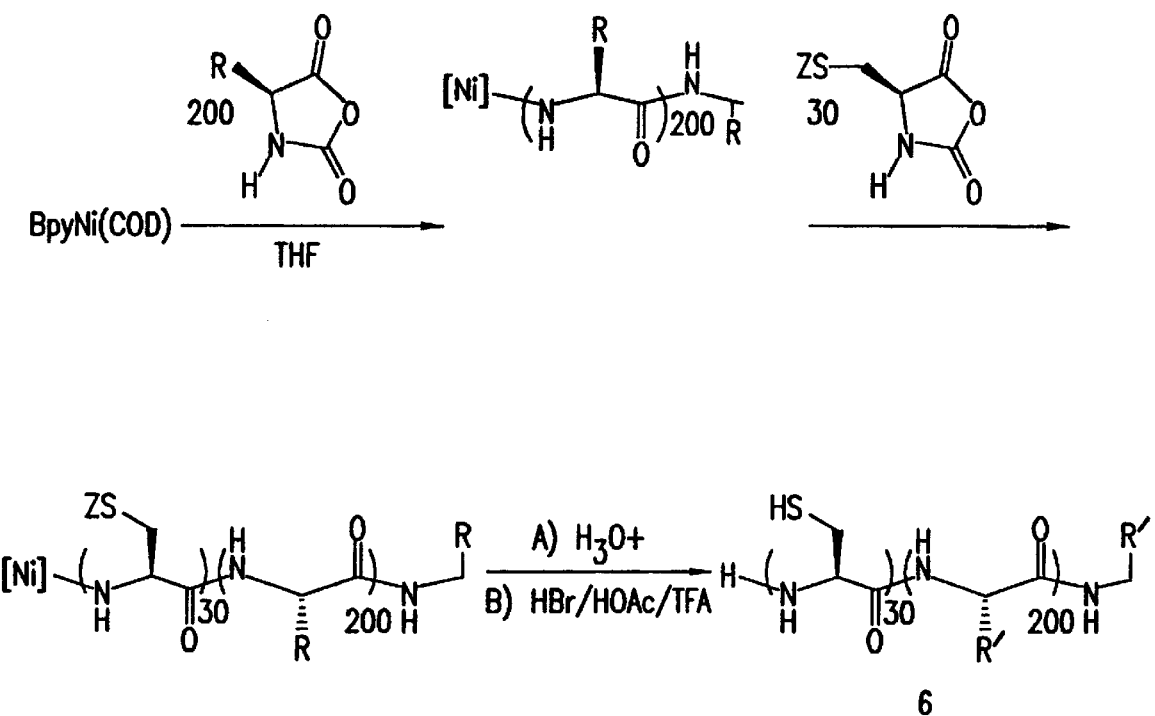
FIG. 4 shows the stepwise polymerization of monomers, N$_\in$-carboxybenzyl-L-lysine NCA followed by S-carboxybenzyl-L-cysteine NCA gave the protected polymer that was then deprotected using equimolar amounts of trifluoroacetic acid and 33% HBr in acetic acid to give 6. BpyNi(COD)=2,2'-bipyridylnickel(1,5-cyclooctadiene). The protected copolymer was analyzed using size-exclusion chromatography in DMF at 60° C. to verify the molecular weight. Polymer composition was verified by $^1$H NMR analysis of the deprotected copolymer in TFA-d.

The block copolypeptides that were synthesized and studied are given in Table 2 (see Example II, below). They were prepared from suitably protected amino acid-N-carboxyanhydride (NCA) monomers by using the initiator 2,2'-bipyridylNi(1,5-cyclooctadiene). This synthetic protocol has been shown to give block copolypeptides of narrow molecular weight distributions and with controlled molecular weights (see FIG. 4). However poly-L-histidine was not used in these studies because of difficulty in protecting the side-chain to form a suitable NCA monomer.

Cationic block copolymers, showed more activity in silica formation than the corresponding anionic copolymer. In fact, poly-L-glutamate completely inhibited the ability of the poly-cysteine block to form silica, which supports the hypothesis that polycations are important for interacting with negatively charged silicate precursors. All of the lysine containing copolymers display some activity in silica formation, and the rate of silica production increased steadily as the domain bound to the poly-L-lysine block became more nucleophilic. Since polymer 1, which contains no nucleophilic component, was able to produce silica, it appears that poly-L-lysine itself, when constrained in a self-assembling block copolymer, possesses a low activity toward the hydrolysis and condensation of TEOS. However, cysteine and lysine containing copolymers are the only ones tested thus far that are able to control the shape of the silica during its formation, with the cysteine-containing polymers being most active. Accordingly, the synthetic cysteine-lysine diblock combination is most preferred.

Compositions and Methods of Use

The present invention provides methods for in vitro polymerization of silica and silicone polymer networks. The first step of the method is to combine a catalyst and a substrate, wherein the substrate is selected from the group consisting of silicon alkoxide, metal alkoxide, and organic conjugates of the foregoing. Accordingly, compositions for use in the polymerization method include a substrate and a catalyst, described in further detail above, which assembles, hydrolyzes, and condenses the substrate at about neutral pH. Preferably, the substrate is a silicon alkoxide, such as silicon tetraethoxide and organically modified silicon triethoxides. More preferably, the substrates are of the general formula R—Si—(O—Et)$_3$, wherein Et is ethyl and R is methyl, phenyl, or ethoxy. These substrates are preferred because of their stability at neutral pH, and the similarity of their chemical reactivity to that of the substrates of proteases.

Figure 1B:
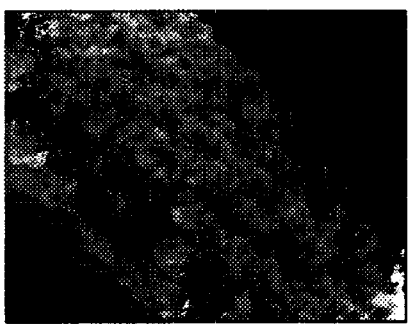
Figure 1C:
Figure 1D:
Figure 1E:
Figure 1F:

The next step of the method is to polymerize the substrate to form silica, polysiloxanes, polymetallo-oxanes, or mixed poly(silicon/metallo)oxane materials at about neutral pH. When organically substituted silicon trioxides are provided as substrates, the silicateins catalyze their condensation to form the corresponding polysilsesquioxanes $(RSiO_{3/2})_n$, wherein R is an alkyl or phenyl group. For example, reaction of the macroscopic silicatein filaments with phenyl- or methyl-triethyloxysilane promotes rapid polymerization with scaffolding of the resulting silsesquioxane polymer network on the silicatein filament (See FIG. 1C). The in vitro synthesis of silicas and silsesquioxanes by the catalysts of the present invention at neutral pH illustrates how this mechanism may be harnessed for the development of environmentally benign new routes to the synthesis of patterned silicon-based materials.

Moreover, the shapes of the silicon containing polymers produced by the method of the present invention can be varied, depending on the catalyst. For example, when macroscopic silicatein filaments are used as catalysts, the silica or silsesquioxanes product is formed over the surface of the filament, following the contours of the underlying macromolecular topology (See, e.g., FIGS. 1A, 1B). Thus, the silicatein filaments exhibit both "scaffolding" (macroscopic structure-directing) and catalytic activities in directing the condensation of the alkoxides to form polysiloxanes in vitro.

The synthesis of polymeric networks of phenyl- and methyl-silsesquioxanes coating the surface of the silicatein filaments at neutral pH in vitro shows that this mechanism may be utilized for shaping silicon-based materials. However, silica formed by using oligo-L-cysteine is an amorphous powder with no defined macroscopic shape. Thus, simple homopolymers of amino acids, which lack the structural complexity and polyfunctionality found in proteins, are unable to reproduce the shape-controlling ability of silicatein. Surprisingly, block copolypeptides of cysteine and lysine can be used to mimic biological silica synthesis, wherein hydrolysis and condensation of an inorganic phase as well as structural templating are all controlled by a single synthetic material at pH 7. Since assembly of cysteine containing block copolypeptides is influenced by oxidation of the cysteine sulfhydryl groups, different silica structures can be produced from a single copolymer exposed to different oxidizing conditions. For example, transparent, hard silica spheres or elongated globules are formed by using the fully reduced cysteine-lysine copolymers, while oxidation of the same cysteine-lysine copolymer leads to formation of well-defined columns of amorphous silica.

EXAMPLES

These additional embodiments may be better understood with reference to the accompanying examples, which are intended for purposes of illustration only and should not in any sense be construed as limiting the scope of the invention as defined in the claims appended hereto.

Example 1

Silicatein Filaments and Subunits from a Marine Sponge Direct the Polymerization of Silica and Silicones in Vitro Materials and Methods Isolation of Silicatein Filaments and Analysis of Reactions With Silicon Alkoxides. Insoluble silicatein filaments were extracted from the acid- and hypochlorite-cleaned silica spicules of *Tethya aurantia* by dissolving the silica in buffered HF (1M HF, 5M NH$_4$F) as described previously [Shimuzu et al. (1998), supra]. The HF was removed by dialysis against pure water (Milli-Q) and the filaments collected by filtration. Reactions of the insoluble filaments [either air-dried or suspended (at 0.5 mg/ml) in Tris-HCl buffer (0.6 ml, 25 mM, pH 6.8)] with TEOS (1.0 ml; 4.5 mmoles) were performed with gentle shaking at room temperature for 12 h. The silicatein filaments were added in aqueous Tris buffer for all reactions except that illustrated in FIG. 1C, in which the air-dried filaments were reacted with pure TEOS. The reaction also was performed with phenyltriethoxysilane (FIG. 1D) in place of TEOS, using 1.0 ml (4.1 mmoles) of phenyltriethoxysilane. For all samples the insoluble materials were collected by centrifugation, air-dried, gold sputter-coated and imaged by scanning electron microscopy with a JEOL JSM 6300F equipped with a cold cathode field-emission source operated at a beam energy of 3.5 kV (FIG. 1).

NMR Analyses. NMR spectra were acquired on a CMX-500 Chemagnetics spectrometer operating at 11.7 Tesla and a $^{29}$Si frequency of 99.06 MHZ referenced to TMS [Smaihi, M., Jermourni, T., & Marignan, J. (1995) Chem. Mater. 7, 2293–2299]. The single-pulse spectrum was acquired for 22 h with an 8.35 μs single pulse and a recycle delay of 300s while spinning at 3.5 kHz. Cross-polarization MAS spectra were acquired for 4 h with a contact time of 4 ms, a pulse width of 6 gs, and a recycle delay of 2 s while spinning at 6 kHz.

Silicatein Subunits, and Analysis of Reactions with Silicon Alkoxides. Silicatein subunits (Table 1A) were solubilized from the purified filaments [Shimuzu et al. (1998), supra] by treatment with 10 mM NaOH for 5 min, and the soluble subunits then dialyzed extensively at 4° C. against Tris-HCl buffer (25 mM pH 6.8). Silicatein α (Table 1B) was expressed from a recombinant DNA template in *E. coli*, purified and reconstituted by standard procedures [Zhou et al. (1999), supra] and dialyzed as above. Denatured proteins were boiled for 15 min. The proteins then were utilized immediately for the following assay: TEOS (1 ml; 4.5 mmoles) was added to 0.6 ml protein (0.26 or 0.5 mg/ml in Tris buffer as specified). The mixtures were thoroughly resuspended by pipetting and the reactions allowed to continue for 15–60 min at 20 ° C. The samples then were centrifuged to collect the silica products; the pellets were washed a minimum of 3 times with ethanol to remove unreacted TEOS, collected by centrifugation and then either hydrolyzed with 1M NaOH for 10 min or suspended only with water to quantify residual adsorbed TEOS. The samples then were diluted and the released silicic acid quantified using a modification of the calorimetric molybdate assay [Strickland, J. D. H. & Parsons, T. R. (1972) in *A Practical Handbook of Seawater Analysis* (2nd ed.) Fish. Res. Bd. Can. Bull.] with the reagent blank of Brzezinski & Nelson [Brzezinski, M. A. & Nelson, D. M. (1986) Mar. Chem. 19, 139–151] yielding a detection limit of 50 nM Si(OH)$_4$.

TABLE 1

Silicatein subunits catalyze polymerization of silica

| Protein | Polymerized Si (nmoles) |
|---|---|
| A. | |
| Silicatein subunits | |
| Native | 214.0 + 2.0 |
| Denatured | 24.5 + 2.0 |
| Bovine serum albumin | 42.1 + 0.7 |
| Papain | 22.9 + 1.0 |
| Trypsin | 16.2 + 2.6 |
| (None) | 10.2 + 1.3 |
| B. | |
| Recombinant silicatein α | |
| Native | 140.0 + 6.2 |
| Denatured | 8.8 + 1.9 |
| (None) | 6.7 + 2.1 |

Proteins in 0.6 ml Tris-HCl buffer (25 mM, pH 6.8) were incubated with 1 ml (4.5 mmoles) TEOS and the polymerized silica quantitated after centrifugation and hydrolysis as described in Materials and Methods. (A) Proteins at 0.3 mg; reaction for 15 min; (B) protein at 0.06 mg; reaction for 60 min.

Results

The silicatein filaments can be dissociated to their constituent subunits, α, β and γ [Shimuzu et al. (1998), supra]. These subunits accelerate the in vitro polymerization of silica $(SiO2)_n$ from the monomeric TEOS at neutral pH (Table 1A). Electron microscopy confirms the formation of a dendritic silica precipitate (not shown). Little polymerization is seen in the absence of these proteins; it is known that under these conditions, polymerization of silica from TEOS normally requires either an acid or base catalyst. The activity of the silicatein subunits is abolished by thermal denaturation, demonstrating a dependence on the native 3-dimensional conformation of the subunit proteins. Denaturation with the detergent, SDS (sodium dodecyl sulfate), also abolishes activity (results not shown). Specificity of the observed effect is indicated by the finding that the condensation of TEOS under these conditions is significantly slower when trypsin, papain, or bovine serum albumin are substituted for the silicatein.

Silicatein α comprises ca. 70% of the mass of the silicatein filaments in *Tethya aurantia* [Shimuzu et al. (1998), supra]. This subunit, when expressed in bacteria from a recombinant DNA template and subsequently purified and reconstituted, proves to be sufficient to accelerate the polymerization of silica from TEOS at neutral pH (Table 1B). In this case also, thermal denaturation abolishes reactivity with the silicon alkoxide. These findings are significant because the complete amino acid sequence of the a subunit reveals a high similarity to members of a well-characterized enzyme superfamily [Shimuzu et al. (1998), supra].

Figure 2:
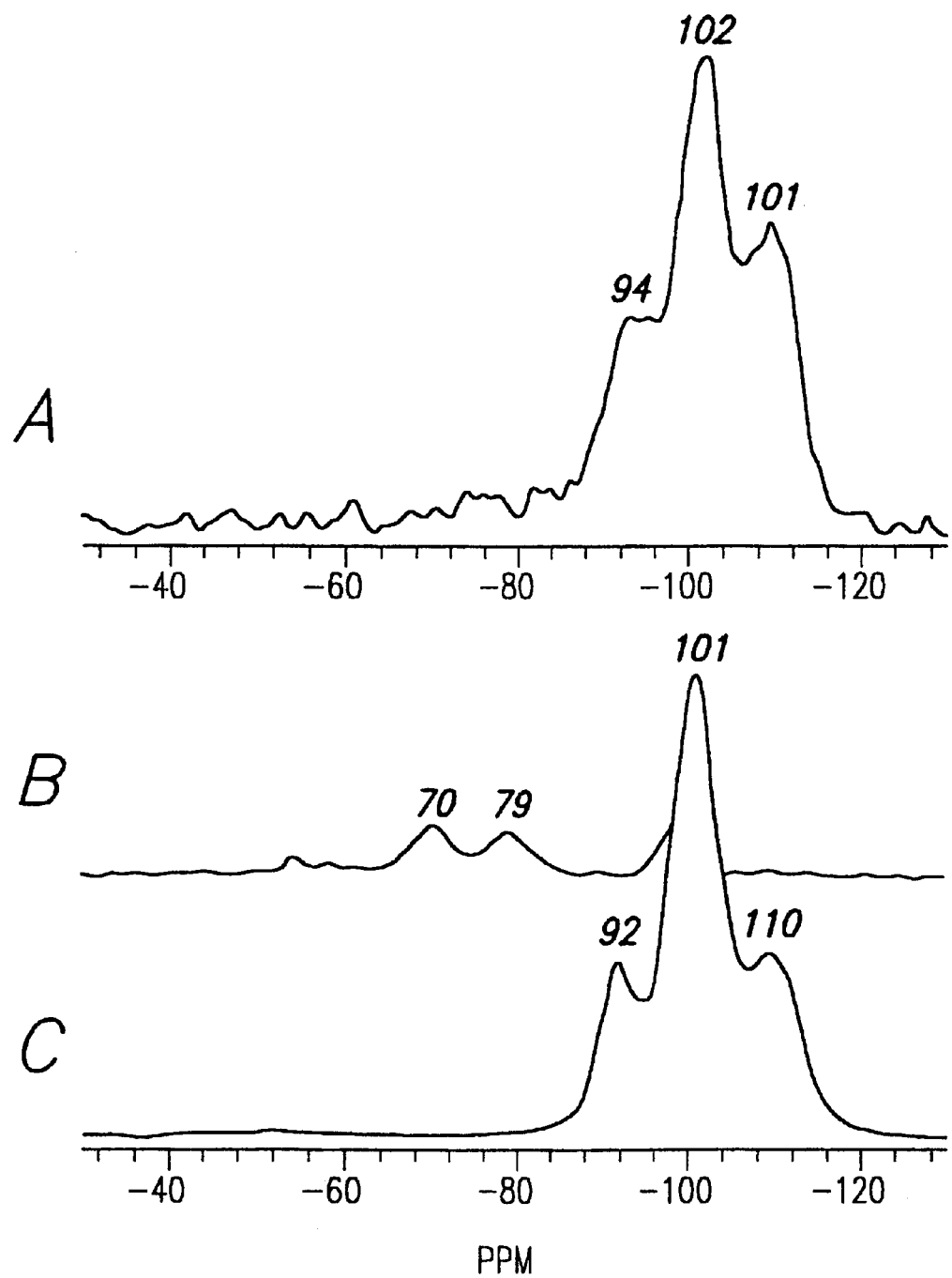
FIG. 2 shows $^{29}$Si magic-angle spinning (MAS) NMR spectra of silica and silsesquioxane products on silicatein filaments [Schwab, D. W. & Shore, R. E. (1971) *Biol. Bull.* 140, 125–136]. Samples were prepared as described for FIG. 1B and D. (A) A single-pulse MAS spectrum of the reaction product of silicatein filaments and TEOS. (B and C) Cross-polarization MAS spectra of the reaction products of silicatein filaments and phenyltriethoxysilane (B) and TEOS (C) respectively.

The intact silicatein filaments also are active, promoting the condensation of silicon alkoxides and organically modified silicon alkoxides to form the corresponding polymerized silica or silsesquioxanes $(RSiO_{3/2})_n$ (silicones in which R=an organic sidechain) at neutral pH (FIGS. 1 and 2). The macroscopic filaments serve as scaffolds to organize the deposition of the resulting silica and silsesquioxanes (FIG. 1). Organization of the resulting silica is more clearly seen when the condensation of TEOS is performed in the absence of added water (other than the water of protein hydration), restricting the dendritic growth of the silica by limiting hydrolysis of the precursor to create a silica substructure that follows the longitudinal axis of the protein filament (FIG. 1C). In the absence of the filaments, no polymerization of TEOS was observed at neutral pH during the course of the experiments, consistent with the known requirement for acid or base catalysis. The activity of the silicatein filaments is abolished by thermal denaturation, indicating a dependence on the native conformation of the constituent proteins. Neither silk (not shown) nor cellulose (FIGS. 1E, F) fibers exhibit any activity with TEOS under the same conditions, demonstrating that polymeric fibers with high surface densities of hydroxyl groups are not sufficient to accelerate or organize silica polymerization from TEOS at neutral pH. The acceleration of polymerization and structure-directing activities of the silicatein filaments also are evident with organically substituted triethoxysilane precursors with the general structure R—Si—(OEt)$_3$, where R=phenyl, methyl, etc. When phenyltriethoxysilane is provided as substrate, a polymerized product is formed on the protein filaments (FIG. 1D), while under the same conditions (pH 6.8, 24 h) in the absence of the protein filaments little or no condensation of the precursor was observed. Similar results were observed with methyltriethoxysilane as well.

The synthesis of polymeric networks of phenyl- and methyl-silsesquioxanes by the silicatein filaments at neutral pH in vitro suggests that this mechanism may be harnessed for the development of environmentally benign new routes to the synthesis of patterned silicon-based materials. Solid-state $^{29}$Si NMR was used to analyze the extent of polymerization of the siloxanes on the protein filaments. Analysis of the product formed from TEOS (FIGS. 2A, C) revealed three inhomogeneously broadened peaks corresponding to Q$^2$ (−90 ppm), Q$^3$ (−100 ppm) and Q$^4$ (−110 ppm) siloxane species, indicative of a disordered, incompletely polymerized opal-like silica network characteristic of the silica found in biological materials. In contrast to these results, cross-polarization $^{29}$Si NMR analysis of the product formed from the phenyltriethoxysilane precursor revealed no Q$^4$ species (FIG. 2B). This result is consistent with the silsesquioxane structure of the polymerized product, as would be predicted from polymerization of the precursor which contains only three functional groups available for the formation of siloxane linkages. The phenylsilsesquioxane exhibits a T$^3$ resonance at −79 ppm (shifted downfield by 20 ppm due to the phenyl substituent) [Smaihi et al. (1995), supra] and possible T$^2$ and T$^1$ resonances.

Example II

Block Copolypeptide Mediated Biomimetic Synthesis of Ordered Silica Structures

Block copolypeptides were screened for their ability to react with TEOS to form silica. Referring to Table 2 (below): Yield=total isolated yield of deprotected copolymer. SiO$_2$ Rate=initial rate of silica formation ($\mu$moles/h) mediated by block copolypeptide at a concentration of 5 mg/ml in 50 mM Tris-HCl buffer, pH 6.8 and an initial TEOS concentration of 3.4 M. The silica precipitate was collected by centrifugation, washed with 95% ethanol and solubilized in 0.2 M NaOH at 37° C. The amount of silica was then determined using the spectrophotometric molybdate assay (24,25). N$_2$=silica preparation was carried out under an oxygen-free nitrogen atmosphere; Air=silica preparation was carried out in air. In the absence of polymer, buffer alone was used as the control. Shape=morphology of silica particles: N=non-ordered; S=spheres; E=elongated globules; C=columns. NA=not applicable.

TABLE 2

| Entry | Composition | Yield (%) | SiO$_2$ Rate N$_2$ | Air | Shape N$_2$ | Air |
|---|---|---|---|---|---|---|
| 1 | poly(L-Alanine$_{30}$-b-L-Lysine$_{200}$) | 87 | 9.09(2) | NA | N | NA |
| 2 | poly(L-Glutamine$_{30}$-b-L-Lysine$_{200}$) | 88 | 9.22(7) | NA | N | BA |
| 3 | poly(L-Serine$_{30}$-b-L-Lysine$_{200}$) | 84 | 0.29(3) | NA | N | NA |
| 4 | poly(L-Tyrosine$_{30}$-b-L-Lysine$_{200}$) | 86 | 0.30(7) | NA | N | NA |
| 5 | poly(L-Cysteine$_{10}$-b-L-Lysine$_{200}$) | 76 | 0.60(2) | 0.60(2) | S | S |
| 6 | poly(L-Cysteine$_{30}$-b-L-Lysine$_{200}$) | 77 | 0.43(2) | 0.62(4) | S | C |
| 7 | poly(L-Cysteine$_{60}$-b-L-Lysine$_{200}$) | 87 | 0.37(4) | 0.67(1) | E | C |
| 8 | poly(L-Cysteine$_{30}$-b-L-Lysine$_{400}$) | 88 | 0.62(1) | 0.65(4) | S | S |
| 9 | poly(L-Cysteine$_{30}$-b-L-Glutamate$_{200}$) | 90 | 0.01(1) | 0.01(1) | NA | NA |
| 10 | poly(L-Cysteine$_{30}$) | 76 | 0.43(6) | 0.08(1) | N | N |
| 11 | poly(L-Lysine$_{200}$) | 96 | 0.01(1) | NA | NA | NA |
| 12 | none | NA | 0.01(1) | NA | NA | NA |

Since TEOS is stable when mixed with water at neutral pH, a successful biomimetic silica synthesis from this precursor requires an agent that displays hydrolytic activity simultaneously with structure-directing properties. Site-directed mutagenesis of the cloned DNA coding for silicatein a revealed that interacting histidine and serine residues were required for the hydrolytic activity of this protein. Based on this precedent, simple homopolypeptides of amino acids bearing polar functional groups were evaluated for their ability to mimic the properties of silicatein in the polycondensation of silicon alkoxides. When the homopolymers of L-lysine, L-histidine, DAL-serine, L-threonine, and L-glutamic acid were separately dissolved in aqueous pH 7 buffer and mixed with TEOS, it was found that none of these polymers was able to, produce silica at ambient temperature over a 24 hour period. Furthermore, mixtures of these homopolymers also failed to catalyze TEOS hydrolysis and condensation. In contrast, we found that oligomers of L-cysteine (ca. 3000 Da, used since higher chain lengths were insoluble) efficiently produce silica from TEOS in pH 7 buffer (Table 2), when handled under an inert nitrogen atmosphere to prevent oxidation. This result was presumably due to the nucleophilicity of the sulfhydryl group, which may enable it to initiate hydrolysis of the silicon alkoxide. When these oligomers were used under air, oxidation of the sulfhydryl groups to disulfides resulted in insoluble aggregates that were much less active in silica formation (Table 2). However, the silica formed by using oligo-L-cysteine was an amorphous powder with no defined macroscopic shape. From these results we concluded that simple homopolymers of amino acids, which lack the structural complexity and polyfunctionality found in proteins, are unable to reproduce the shape-controlling ability of silicatein.

In an effort to better mimic this protein, we synthesized diblock copolypeptides that contained covalently linked domains (blocks) of water soluble and insoluble polypeptides. Dissimilarity in the block segments imparted the chains with an amphiphilic character, similar to that of surfactants, which resulted in self-assembly of the chains in aqueous solution. The architecture and design of the block copolypeptides also provided a means to solubilize water-insoluble domains, e.g. hydrolytically active poly-L-cysteine. For these reasons, block copolypeptides were expected to allow the directed cooperative assembly, hydrolysis, and condensation of TEOS to form specific silica structures. The solubilizing block copolypeptide components were either cationic or anionic polyelectrolytes, such as poly-L-lysine and poly-L-glutamate, which are known to be water soluble at pH 7. As water insoluble domains, poly-L-cysteine and poly-L-serine were chosen both for their potential silica-forming hydrolytic activity as well as their ability to aggregate in, water by either hydrogen or covalent bonding via β-sheet formation or disulfide linkages. Other insoluble domains chosen included polar residues that were less nucleophilic than cysteine (poly-L-glutamine and poly-L-tyrosine) or slightly hydrophobic (poly-L-alanine). Poly-L-histidine was not used in these studies because of difficulty in protecting the side-chain to form a suitable NCA monomer. The block copolypeptides that were synthesized and studied are given in Table 2. They were prepared from suitably protected amino acid-N-carboxyanhydride (NCA) monomers by using the initiator 2,2'-bipyridylNi(1,5-cyclooctadiene). This synthetic protocol has been shown to give block copolypeptides of narrow molecular weight distributions and with controlled molecular weights (FIG. 4) [Deming, T. J. (1997) Nature 390, 386–389].

The cationic block copolymers, showed more activity in silica formation than the corresponding anionic copolymer. In fact, poly-L-glutamate completely inhibited the ability of the poly-cysteine block to form silica, which supports the hypothesis that polycations are important for interacting with negatively charged silicate precursors. All of the lysine containing copolymers displayed some activity in silica formation, and the rate of silica production increased steadily as the domain bound to the poly-L-lysine block became more nucleophilic. Since polymer 1, which contains no nucleophilic component, was able to produce silica, it appeared that poly-L-lysine itself, when constrained in a self-assembling block copolymer, possessed a low activity toward the hydrolysis and condensation of TEOS. However, the cysteine and serine containing copolymers were the only ones that were able to control the shape of the silica during its formation, with the cysteine-containing polymers being most active. For these reasons, further studies were focused on the cysteine-lysine block copolymer combination.

Figure 5A:
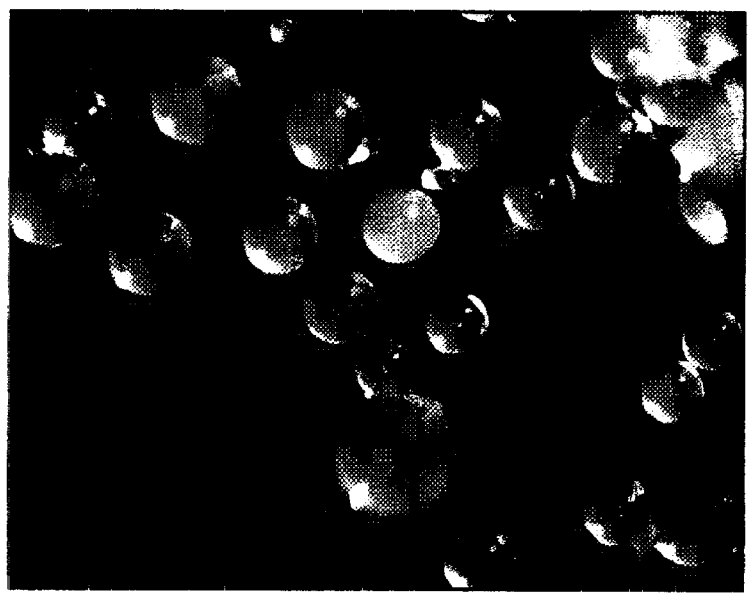
FIG. 5 shows different ordered silica shapes obtained using block copolypeptide 6. In a typical procedure, TEOS (2.0 mL) was added to 500 μL of a solution of 6 (5 mg/mL in 50 mM Tris-HCl buffer, pH 6.8), and the resulting biphasic mixture was agitated vigorously and then allowed to stand for several hours with no stirring, whereupon some of the TEOS had emulsified into the aqueous phase. After 24 h, the resulting silica precipitate was collected from the aqueous phase, washed with 95% ethanol and air dried. A=optical micrograph of silica spheres obtained from synthesis under nitrogen, bar=200 μm. B=scanning electron micrograph of packed silica columns obtained from synthesis under air, bar=1 μm. The sample was sputter coated with gold and examined with a JEOL JSM 6300F equipped with a cold cathode field-emission source operated at a beam energy of 3.0 kV.
Figure 5B:

In initial experiments, polymer 6 was deprotected and handled under a nitrogen atmosphere and thus was used in its reduced form when reacted with TEOS. Dynamic light scattering measurements of 6 in aqueous solution (1.6 mg/mL) showed that this polymer self-assembled into large aggregates approximately 600 nm in diameter. This colloidal polymer solution, when mixed with TEOS, formed a two-phase system in which some TEOS was emulsified into the aqueous phase. After 24 h, the formation of transparent, composite silica spheres (diameter, ca. 100 pm) was observed (FIG. 5). $^{29}$Si MAS NMR measurements confirmed the existence of highly condensed silica (35% $Q^3$ and 65% $Q^4$ species). When calcined at 500° C., the spheres remained both intact and transparent without a decrease in apparent size, although TGA analysis revealed a 10% weight loss of organic material. BET nitrogen sorption measurements showed that the spheres were mesoporous; with a broad distribution of pore sizes and a surface area of 436 m$^2$/g (20). Using the block copolypeptide 6 to prepare these hard, transparent, mesoporous silica spheres represents the first example in which hydrolysis and condensation of an inorganic phase as well as structural templating were all controlled by a single synthetic material at pH 7, thus mimicking biological silica synthesis. To the best of our knowledge, other surfactant or polymer based systems developed for shape-selective silica synthesis typically require use of a catalyst and extreme pH conditions (10,21, 22).

Copolymers similar to 6, but with different block lengths, were also synthesized to determine the role of copolymer composition on silica-forming ability. A polymer with a shorter cysteine domain, 7, was similar to 6 in being able to produce silica spheres. However, when the length of the cysteine domain was increased (8), the formation of more elongated silica particles was observed. Increasing the size of the lysine domain gave a polymer, 9, which behaved in the same way as the smaller, but similar composition, 7. This indicates that the copolymer chain length has little effect on resulting silica shape. It should be noted that mixtures of L-lysine and L-cysteine homopolymers, in proportions similar to those found in the block copolypeptides 6–9, only gave completely disordered silica powders from TEOS.

An additional feature of the cysteine residues in 6 was their ability to form covalent disulfide bonds as inter- and intra-chain crosslinks upon oxidation of the sulfhydryl groups. After deprotection of the copolymer in air, the formation of such disulfide crosslinks in oxidized 6 was evident from the high viscosity exhibited by this sample upon exposure to water. The gel dissolved readily upon addition of a reducing agent such as β-mercaptoethanol, indicating the presence of disulfide crosslinks. Dynamic light scattering measurements of oxidized solutions of 6 showed that the block copolymer aggregates had increased in size (ca. 1300 nm dia.) relative to unoxidized samples (ca. 600 nm). Surprisingly, when oxidized 6 was mixed with TEOS, the rate of silica formation was found to increase although 70% of the sulfhydryl groups had been converted to disulfide linkages (Table 1). In addition, ordered columns of silica were observed instead of spheres, showing that oxidation of the poly-L-cysteine domains was sufficient to completely modify the resulting topology of the silica (FIG. 2). With copolymers of different composition (Table 2), it could be shown that a minimum fraction of cysteine (ca. 15 mol %) was required to produce the columnar shaped silica composites. These results illustrate the importance of the self-assembled block copolypeptide architecture in the formation of silica shapes. The synthetic capability to directly control silica shape, hydrolysis and condensation rate via adjustment of block copolypeptide composition demonstrated herein presents a new route to the environmentally benign, biomimetic synthesis of inorganic materials.

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and although specific terms have been employed herein, they are intended in a descriptive sense and not for purposes of limitation.

What is claimed is:

1. A method for forming a dioxane, oligo-oxane, or polyoxane product, comprising condensing an alkoxide substrate with another alkoxide material at neutral or near neutral pH using a catalyst comprising a molecule having a nucleophilic group that displaces alkanol from said alkoxide substrate facilitating solvolysis to initiate structure-directed condensation with said another alkoxide.

2. The method of claim 1 wherein said structure-directed condensation is by nucleophilic attack.

3. The method of claim 1 wherein said nucleophilic group forms a transitory intermediate in facilitating solvolysis.

4. The method of claim 3 wherein said transitory intermediate is covalent.

5. The method of claim 1 comprising a group that interacts with said nucleophilic group to increase its nucleophilicity.

6. The method of claim 5 wherein said interaction is by hydrogen bonding.

7. The method of claim 1 wherein either or both of said alkoxides or alkoxide-like material is selected from the group consisting of silicon or other metalloid alkoxides, and organic conjugates of the foregoing, to form the corresponding silica, silsesquioxanes, polymetalloid-oxanes, polymetallo-oxanes, or the corresponding organic conjugates of the foregoing.

8. The method of claim 1 wherein said molecule is a protein.

9. The method of claim 1 wherein said molecule is an enzyme.

10. The method of claim 9 wherein said enzyme is a silicatein.

11. The method of claim 9 wherein said enzyme is a protease.

12. The method of claim 9 wherein said enzyme is a peptidase.

13. The method of claim 9 wherein said enzyme is a hydrolase.

14. The method of claim 13 wherein said hydrolase is selected from the group consisting essentially of amidase, esterase and lipase.

15. The method of claim 9 wherein said enzyme is a catalytic triad enzyme.

16. The method of claim 1 wherein said molecule is a peptide.

17. The method of claim 16 wherein said peptide contains lysine or poly-lysine.

18. The method of claim 16 wherein said peptide contains serine or poly-serine.

19. The method of claim 16 wherein said peptide contains a tyrosine.

20. The method of claim 16 wherein said peptide contains a histidine.

21. The method of claim 16 wherein said peptide contains cysteine, oligocysteine or poly-cysteine.

22. The method of claim 16 wherein said peptide contains a nucleophilic catalytic side-chain.

23. The method of claim 22 wherein said nucleophilic catalytic side-chain is contributed by serine, cysteine, histidine or tyrosine.

24. The method of claim 16 wherein said peptide contains a hydrogen-bonding amine.

25. The method of claim 1 wherein said molecule is a non-peptide-based polymer that operates by a mechanism of catalysis similar to that utilized by silicateins.

26. The method of claim 25 wherein said non-peptide-based polymer contains a hydrogen-bonding amine and/or a nucleophilic group.

27. The method of claim 1 wherein either or both of said alkoxides is a silicon alkoxide.

28. The method of claim 27 wherein said silicon alkoxide is tetraorthoethoxysilicate.

29. The method of claim 1 wherein either or both of said alkoxides is an organosilicon alkoxide.

30. The method of claim 29 wherein said organosilicon alkoxide is methyl-triethoxysilane, or phenyl-triethoxysilane.

31. The method of claim 1 wherein either or both of said alkoxides is a metallo alkoxide.

32. The method of claim 1 wherein either or both of said alkoxides is an organometallo-alkoxide.

33. The method of claim 1 wherein either or both of said alkoxides is a metalloid alkoxide.

34. The method of claim 1 wherein either or both of said alkoxides is a organometalloid alkoxide.

35. The method of claim 27 wherein said product is a silsesquioxane.

36. The method of claim 29 wherein said product is a polyorganosiloxane.

37. The method of claim 31 wherein said product is a polymetallo-oxane.

38. The method of claim 32 wherein said product is a polyorganometallo-oxane.

39. The method of claim 34 wherein said product is a polyorganometalloid-oxane.

40. The method of claim 1 in which said molecule is self-assembling whereby said structure-directed condensation is provided by a spatial array of structure-directing determinants contained on or within the self-assembling molecule.

41. The method of claim 40 in which said spatial array of structure-directing determinants acts in conjunction with the surfaces of any solid support to which said molecule is attached or in which said molecule is confined.

42. The method of claim 40 wherein said molecule is selected from the group consisting essentially of silicatein, protein, enzyme, peptide, and non-peptide-based polymers, and/or any aggregate, filament, or other assembly thereof.

43. The method of claim 1 in which said nucleophilic group is provided by a hydroxyl or sulfhydryl group.

44. A method for forming a dioxane, oligo-oxane, or polyoxane product, comprising condensing an alkoxide substrate with another alkoxide material at neutral or near neutral pH using a catalyst comprising a self-assembling molecule having a nucleophilic group that displaces alkanol from said alkoxide substrate by forming a transitory covalent intermediate facilitating solvolysis to initiate structure-directed condensation with said another alkoxide with structure-directing control of product formation resulting from a spatial array of structure-directing determinants contained on or within the self-assembling molecule acting in conjunction with the surfaces of any solid support to which said molecule is attached or in which said molecule is confined;

said molecule being selected -from the group consisting essentially of silicatein, protein, enzyme, peptide, and non-peptide-based polymers, that operates by a mechanism of catalysis similar to that utilized by silicateins; and either or both of said alkoxides being selected from the group consisting of silicon or other metalloid alkoxides, metallo alkoxides, and organic conjugates of the foregoing, to form the corresponding silica, silsesquioxanes, polymetalloid-oxanes, polymetallo-oxanes, or the corresponding organic conjugates of the foregoing;

wherein said product is a silsesquioxane, a polyorganosiloxane, a polymetallo-oxane, a polyorganometallo-oxane, a polymetalloid-oxane, or a polyorganometalloid-oxane.

45. The method of claim 44 comprising a group that interacts by hydrogen bonding with said nucleophilic group to increase its nucleophilicity.

46. The method of claim 44 in which said nucleophilic group is provided by a hydroxyl or sulfhydryl group.

* * * * *